Oct. 27, 1953    S. J. SUMNERS ET AL    2,656,940
AUTOMATIC VEHICLE PARKING SYSTEM
Filed Dec. 4, 1948    4 Sheets-Sheet 1

SUMNER J. SUMNERS,
HUGH W. FRASER,
INVENTORS.

BY *Harry Kotar*
ATTORNEY.

Oct. 27, 1953  S. J. SUMNERS ET AL  2,656,940
AUTOMATIC VEHICLE PARKING SYSTEM
Filed Dec. 4, 1948  4 Sheets-Sheet 2

SUMNER J. SUMNERS,
HUGH W. FRASER,
INVENTORS.

BY Harry Kolar
ATTORNEY.

Sumner J. Sumners,
Hugh W. Fraser,
INVENTORS.

BY Harry Koller

ATTORNEY.

Patented Oct. 27, 1953

2,656,940

UNITED STATES PATENT OFFICE 2,656,940

AUTOMATIC VEHICLE PARKING SYSTEM

Sumner J. Sumners and Hugh W. Fraser,
Los Angeles, Calif.

Application December 4, 1948, Serial No. 63,474

6 Claims. (Cl. 214—16.1)

This invention relates to an automatic vehicle parking system and more particularly to an automatic garage which will automatically handle and park a maximum number of vehicles in a minimum of space.

The general object of the invention is to provide such an automatic garage which has the constructional elements so arranged and disposed that an automobile may be initially parked automatically in a selected parking stall and automatically and speedily removed from such parking stall when desired for delivery to the owner of the vehicle.

A further object of the invention is to provide an automatic garage which is simple and inexpensive to construct, which will withstand severe service and is composed of a minimum number of parts for initial installation and subsequent convenience of maintenance.

A further object of the invention is to provide an automatic garage in which the automobile is parked automatically with a minimum of manual control by the attendant.

Another object of the invention is to provide an automatic garage which can be handled with a minimum of operating personnel.

Another obect of the invention is to provide an automatic vehicle parking system whereby an automobile is positioned in an elevator and positively controlled during the parking and unparking cycles so that in the transfer of an automobile no damage or injury can occur either to the vehicle or to the operating personnel.

Another object of the invention is to provide a simple and effective means whereby a vehicle is transferred from an elevator into a parking stall and transferred from a parking stall into an elevator automatically.

Another object of the invention is to provide a building construction which will utilize a minimum of ground space with a maximum space for parking automobiles therein.

Another object of the invention is to provide cooperating and coordinated vehicle receiving and transferring devices so that a vehicle may be transferred from an elevator into a parking stall and in the reverse whereby a vehicle may be removed from a parking stall into an elevator for delivery to the owner.

Another object of the invention is to provide a mechanism whereby an automobile may be transferred to either of two oppositely disposed parking stalls on any particular parking floor from a single elevator.

A further object of the invention is to provide an automatic garage so constructed that it is unnecessary to shift vehicles from various positions within the garage; the vehicle is parked within a selected stall and remains there until such time as it is desired for delivery to the owner.

A still further object of the invention is to provide an automatic parking mechanism which may be controlled from a remotely located control panel.

In modern congested cities one of the pressing problems is that of parking vehicles. Parking systems now in use require an unduly large area in order to have access to the parked automobiles or the vehicles must be constantly shifted when a particular vehicle is sought by the owner for use. Many unsuccessful efforts have been made to utilize buildings for the parking of vehicles. In constructions of the prior art the complicated mechanisms, such as transfer cars, etc., have been so prohibitive in cost and intricate in operation that they have failed to solve the problem.

In accordance with the present invention we provide, in general, an automatic vehicle parking system comprising a garage structure having a receiving floor and a plurality of parking floors, a series of elevators operable within elevator shafts in the structure whereby an automobile may be carried to any desired floor, vehicle receiving and transferring devices on each of the elevators adapted to receive an automobile from the receiving floor of the structure, a series of parking stalls on the various parking floors of the structure disposed on opposite sides of each elevator shaft, a central control panel for selecting a desired parking stall and controlling the parking and unparking cycles, and vehicle receiving and transferring devices in each of the parking stalls to assist, in cooperation with the vehicle receiving and transferring device on the elevator, in the automatic transfer of an automobile from the elevator into a selected parking stall when the elevator is in registry with the selected stall, the vehicle receiving and transferring device in the parking stall also acting cooperatively with the vehicle receiving and transferring device on the elevator to transfer the automobile to the elevator when it is desired to remove the automobile from the parking stall for delivery to the owner on the receiving floor.

In the accompanying drawings we have illustrated by way of example, but not by way of limitation, a specific embodiment of our invention. In such drawings

Figure 2:
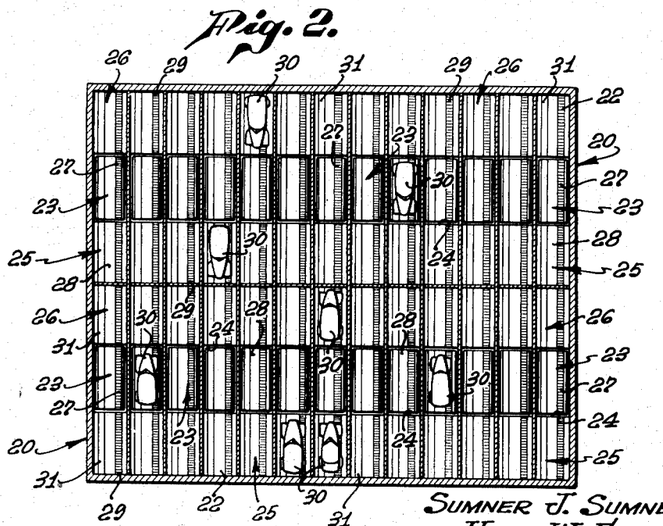
Fig. 2 is a plan view of a parking floor of a garage embodying the invention.
Figure 3:
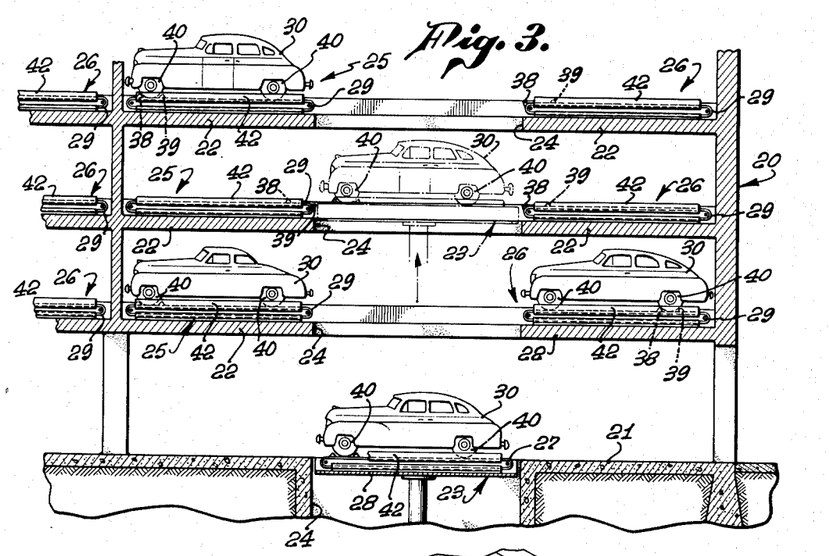
Fig. 3 is a schematic view in side elevation, partly broken away, of a construction embodying the invention showing automobiles parked in parking stalls and an automobile on an elevator about to be parked in a parking stall.
Figure 5:
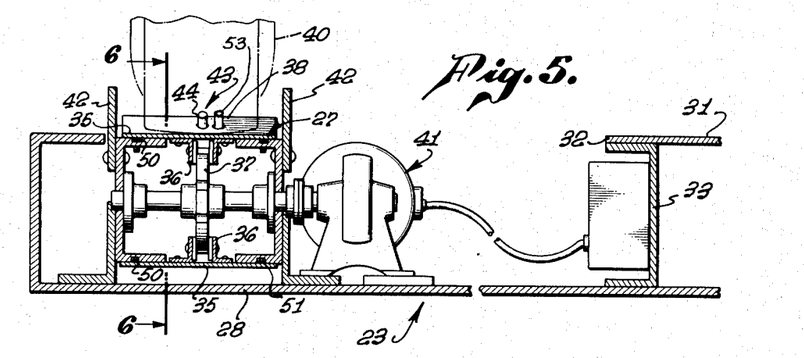
Fig. 5 is a vertical sectional view to indicate the means for actuating the conveying mechanism and showing the platform for carrying a set of wheels of an automobile.

Referring more particularly to the drawing in which similar reference characters identify similar parts in the several views 20 is a building having a receiving or ground floor 21 approximately at street level and a plurality of parking floors 22 which may be either upper floors of a building or subterranean in construction. Constructed within the building 20 is a series of elevators 23 operating within elevator shafts 24. The elevators 23 are conventional in construction and are operated by means of conventional mechanisms, not shown, by means of which an elevator 23 may be directed to any floor and controlled from a remotely located station. As shown in Fig. 2, disposed on each side of the elevator shafts 24 on the various parking floors 22 are a series of parking stalls 25 and 26. As shown in Figs. 3 and 5, an endless member or conveying mechanism 27 is positioned on the elevator platform 28. An endless member 29 is positioned in the stalls 25 and 26 to cooperate with the conveying mechanism 27 on the elevators 23.

As shown in Fig. 3 an automobile 30 may be positioned on the elevator 23 in a manner which will be described more in detail below. The elevator 23 may be controlled to direct the automobile 30 to a parking floor 22 as shown in dotted lines so that the elevator 23 with the automobile 30 thereon is in registry with the parking stalls 25 and 26 on either side of the elevator 23.

Figure 4:
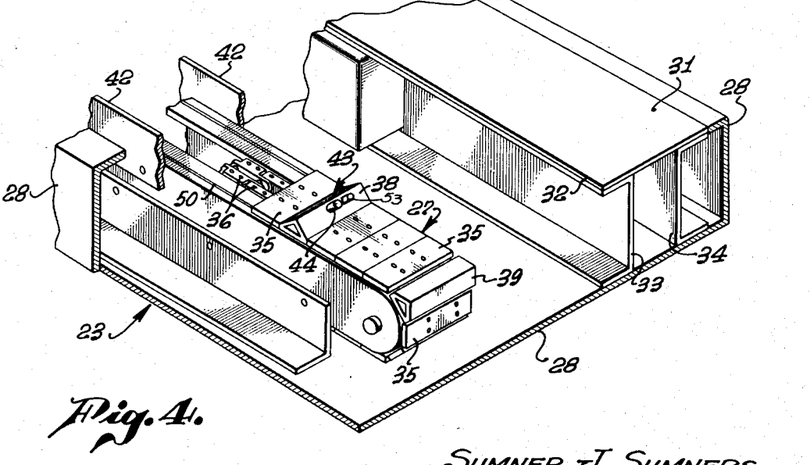
Fig. 4 is a perspective view, partly broken away, of an elevator platform embodying the receiving and transferring mechanism; a similar receiving and transferring mechanism is provided in each parking stall.
Figure 6:
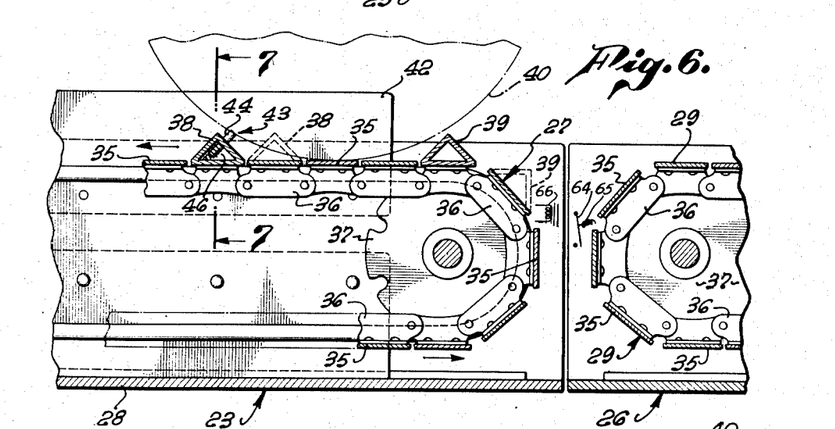
Fig. 6 is a longitudinal cross section along the lines 6—6 of Fig. 5 showing the conveying mechanism when the elevator and a parking stall are in registry.

The receiving and transferring mechanism is similar in construction for both the elevator 23 and the parking stalls 25 and 26 and is shown in detail in Figs. 4, 5 and 6. The receiving and transferring mechanism will now be described with reference to the mechanism positioned on the elevator 23. A platform 31 upon which one set of wheels of an automobile 30 rides is constructed by joining together by welding or otherwise a plate 32 and two channels 33 and 34. Parallel to the platform 31 is an endless member 27. Plates 35 are carried by a chain having links 36 which mesh with a sprocket wheel 37. Chocks 38 and 39 are provided for retaining a rubber-tired wheel 40 of an automobile 30. The mechanism is powered by a reversible motor 41 as shown in Fig. 5. If desired a guide 42 for the wheels of an automobile may be provided as shown in Figs. 4 and 5 to form a runway. A similar guide may be provided for the platform 31 if desired. The platform 31 and the endless member 27 are of a length and width so as to accommodate automobiles of any size normally used.

The platform 31 and the endless member 27 may be constructed flush with the elevator platform 28 but if desired the platform 31 and the endless member 27 may be positioned on the elevator platform 28 in which case the cooperative endless member 29 in the parking stalls 25 and 26 and the wheel carrying platform in the stalls 25 and 26 would be similiarly raised as shown in Figs. 4 and 6.

When the elevator 23 is properly aligned with any two oppositely disposed storage stalls 25 and 26 as shown in dotted lines in Fig. 3 the platform 31 is in line with the wheel carrying platform of the stalls 25 and 26 and the endless member 27 of the elevator 23 is in line with the endless member 29 in the stalls 25 and 26. This is shown more clearly in Fig. 6. The chocks 38 and 39 on the endless member 29 in the stalls 25 and 26 are positioned as shown in Fig. 3 in a condition to engage a wheel of an automobile 30 when the stalls 25 and 26 are empty.

Figure 7:
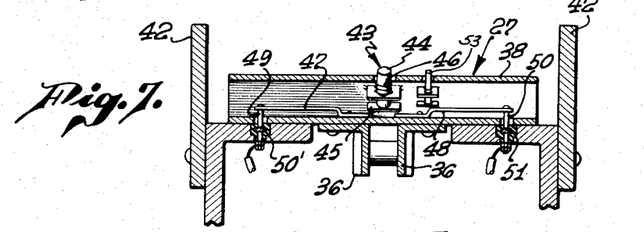
Fig. 7 is a vertical sectional view along the lines 7—7 of Fig. 6 showing a pressure switch located on the endless member.

The endless members 27 and 29 are provided with pressure switches similar to 43 as shown in Fig. 7. The pressure switch 43 consists of a pin 44 having a contact plate 45 at its lower portion. A spring 46 maintains the switch 43 in open position until such time as the pressure of the wheel 40 of an automobile 30 presses the pin 44 down. When this is accomplished contact is made by the contact plate 45, the arms 47 and 48 of which have downwardly depending fingers 49 and 50 at the extremities thereof riding in contact grooves 50' and 51 which are connected to an electrical circuit as shown in Fig. 7.

Figure 1:
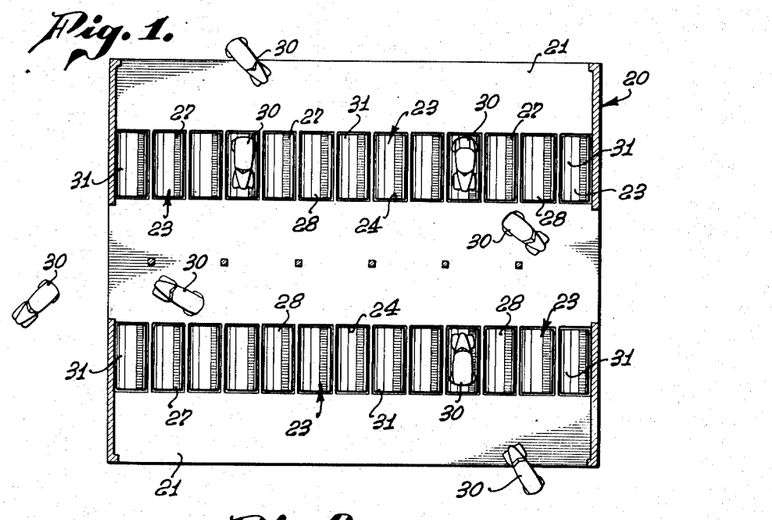
Fig. 1 is a plan view of the receiving or first floor of a construction embodying the invention.

An owner of an automobile 30 who wishes to park the vehicle drives the automobile 30 into the garage through one of the entrances on the receiving floor 21 of the building 20 as shown in Fig. 1. The attendant examines a control board and ascertains which of the parking stalls 25 and 26 are empty. He then directs the vehicle to an appropriate elevator 23 which may be entered at either end thereof. If it is desired to park the automobile 30 in a parking stall 26, i.e., to the right of the elevator 23 as shown in Fig. 3, the endless member 27 is positioned as shown in Fig. 4. The automobile 30 is then driven onto the elevator 23 until the left front wheel 40 of the automobile 30 contacts the front chock 38. The attendant by means of a relief switch, not shown, actuates the motor 41 driving the endless member 27 in a counter-clockwise direction as viewed in Fig. 4 which brings the rear chock 39 around to retain the wheel 40 in the position shown in Fig. 6. The endless member 27 is then further actuated by means of the motor 41 in a counter-clockwise direction until the automobile 30 is positioned on the elevator 23 as shown in Fig. 3. This operation may be accomplished automatically by utilizing a switch which upon contact of a wheel of the automobile closes a circuit including the motor 41 to actuate the conveying mechanism, i.e., the endless member 27 when an automobile 30 is driven onto the elevator 23. A limit switch would then be utilized to control the length of travel of the endless member 27 and would cut off the motor 41 when the automobile 30 has been properly positioned on the elevator 23.

If it is desired to park an automobile 30 in a stall 25, i.e. to the left of the elevator 23 as shown in Figure 3 the chocks 38 and 39 have to be positioned in such a way that after the car is located on the elevator the chocks will straddle the left rear wheel of the car rather than the left front one. This is accomplished in the following way: as the attendant finds from an examination of his control board that a parking stall 25 is the one to be used, he positions the endless member 27 of the elevator by rotating it clockwise from the position shown in Figure 4 until chock 38 takes the position where chock 39 is in this figure. Obviously chock 39 will then be located below the endless member 27. Both chocks are now out of the path of the incoming automobile 30 as it is driven onto the elevator 23 until the front wheels of the vehicle are completely on the elevator. Just before the rear wheels enter, the endless member is set in motion by the attendant to rotate in a counterclockwise direction in order to position chock 38 in front of the left rear wheel, and chock 39 takes its place behind the wheel. Unloading of the car 30 from elevator 23 into stall 25 will be done by rotating the endless member 27 counterclockwise. The positioning of chocks as described here may be done semiautomatically by interlocking the selector switch of the control board with a relief switch for a clockwise rotation of the endless member 27 past the position shown in Figure 4 when the selector switch is set for parking in the stall 25. A limit switch may be located below the endless member 27, that will stop the rotation of it when in the proper position and may be actuated by the chock 39.

Figure 8:
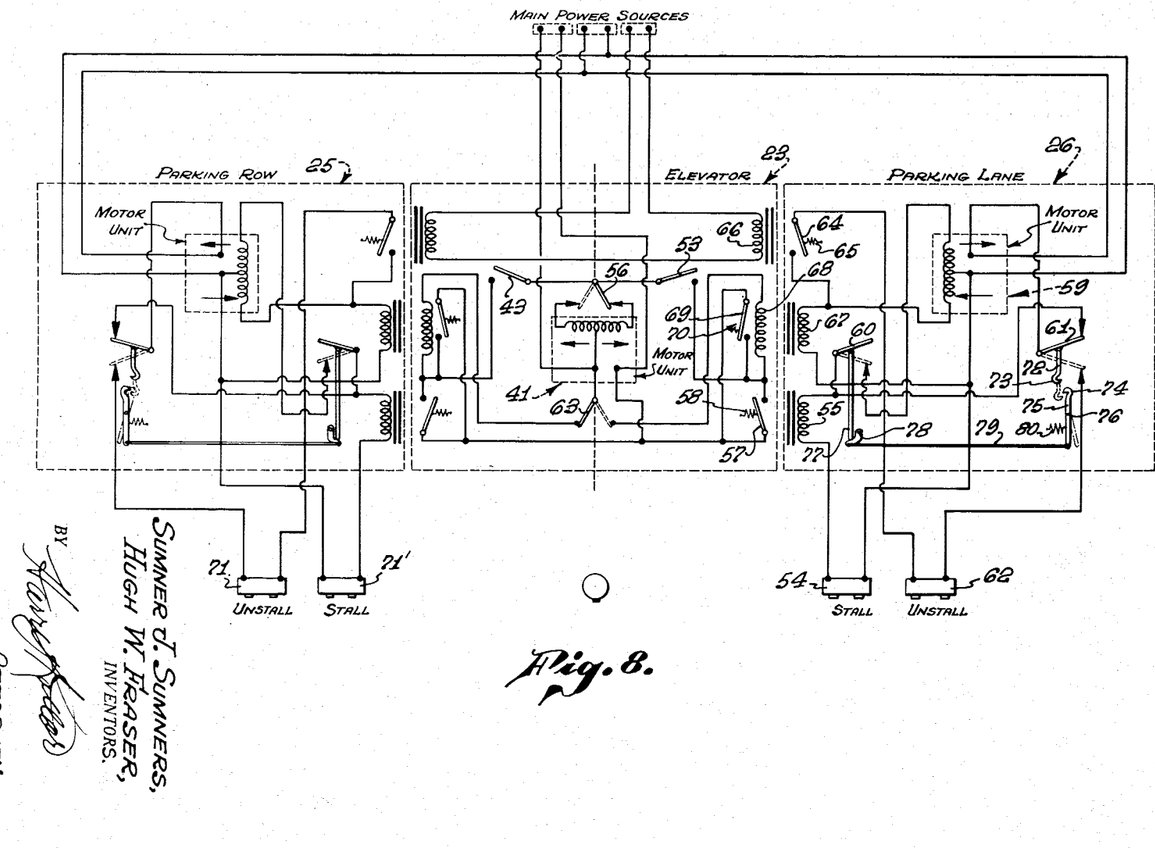
Fig. 8 is a wiring diagram illustrating the method of actuating the mechanism for parking and unparking a vehicle automatically.

After an automobile 30 has been thus positioned on the elevator 23 the entire parking operation is carried on automatically and controlled from a central point, preferably on the receiving floor 21. The automobile 30, by means of its weight, depresses the pressure switch 43 which is in contact with one of the wheels of the automobile 30. A similar pressure switch 53 on the endless member 27, which is shown schematically in Fig. 8 is similarly depressed. The function of these pressure switches 43 and 53 will be described more fully below.

The parking operation will be outlined in the instance when it is desired to park an automobile 30 positioned on the elevator 23, with its brakes open, in the empty parking stall 26 on the third floor of the building 20 as shown in Fig. 3. The chocks 38 and 39 retain the front left wheel 40 of the automobile 30. This is illustrative of the method of parking in any of the parking stalls 25 and 26.

The operator closes the stall switch 54, shown schematically in Fig. 8, which automatically throws the selector switch 56 to the right hand position. The closing of the stall switch 54 closes the circuit which energizes a solenoid comprising a coil 55. Similar coils are likewise energized on each of the various parking floors 22. The coil 55 is located in the face of the stall 26 facing the elevator shaft 24. The attendant then presses the button designating the floor at which the elevator will stop, at which floor there is an empty parking stall 26. The operation of the elevator mechanism is well known to those skilled in the art and is not shown.

As shown in Fig. 8 when the automobile 30 is positioned on the elevator 23 the pressure switches 43 and 53 are depressed by the weight of the automobile 30. Positioned on the elevator 23 and facing the stall 26 is a switch 57 which is maintained in open position by means of a spring 58 but which switch 57 is adapted to be electromagnetically attracted by the coil 55. When the elevator 23 passes each floor on its way to the parking floor 22 selected by the operator the coils 55 on the various floors register with the switch 57 on the elevator and contact is made but due to the fact that the elevator is traveling past the parking floors 22 contact is made only momentarily. When the elevator 23 reaches the selected parking floor 22 and the selected parking stall 26 the endless member 27 on the elevator 23 and the endless member 29 in the stall 26 are in registry. Similarly the coil 55 and the switch 57 are in registry and the motor 41 on the elevator is actuated, the switch 57 being closed through the action of the coil 55. The motor 41 turns in the direction indicated by the arrow in Fig. 8, i. e., to the right, the sprocket wheel 37 turning clockwise (as shown in Fig. 6) moving the plates 35 in a direction propelling the automobile 30 into the stall 26, the chocks 38 and 39 insuring a positive grip on the front left wheel 40 of the automobile 30. The right wheels of the automobile 30 ride on the wheel carrying platform 31.

When the left rear wheel of the automobile 30 contacts the plates 35 of the endless member 29 of the stall 26 a pressure switch 60 automatically closes due to the weight of the automobile 30 and a circuit including the motor 59 in the stall 26 is closed, the motor 59 thus actuating the endless member 29, including the wheel engaging chocks 38 and 39, to the right as indicated by the arrow in Fig. 8, the automobile 30 being propelled through the action of both endless members 27 and 29 into the stall 26. As the front left wheel 40 of the automobile 30 moves off the elevator 23 the switch 53 opens due to the removal of the weight of the automobile 30 and the endless member 27 is disabled as the circuit leading to the switch 53 and the motor 41 is broken. When the automobile 30 is completely in the stall 26 the switch 61 is depressed breaking the circuit for the endless member in the stall 26. The switch 61 is two pole and in its depressed position registers on the control panel indicating that the stall is occupied. The operation of such an annunciator switch is well known to those skilled in the art. By means of a linkage which will be described below the switch 61 is maintained in closed position until the automobile 30 is removed from the stall 26. When the attendant notes on the control panel that the stall 26 is occupied he presses the button which controls the elevator 23 sending the elevator 23 to the receiving floor 21 for the reception of another vehicle or to a parking floor 22 for unparking a vehicle from one of the parking stalls 25, 26.

The unparking operation is conducted as follows: When the owner of an automobile 30 indicates that he is ready for his vehicle which has been parked in one of the series of stalls 26 he notifies the attendant. The operator closes the unstall switch 62 which automatically throws the selector switch 56 to the left hand position as shown in Fig. 8 and the selector switch 63 is automatically thrown to the right hand position. The operator then pushes the elevator button sending the elevator 23 to the required parking floor 22.

The closing of the unstall switch 62 closes the circuit leading to the switch 64 which is maintained in open position by means of a spring 65 but which switch 64 is adapted to be electromagnetically attracted by a solenoid comprising a coil 66. The switch 64 is positioned on the face of the stall 26 facing the elevator shaft 24. The closing of the unstall switch 62 likewise closes the circuit leading to the solenoid comprising the coil 67 through the switch 64. The coil 66 is positioned on the face of the elevator 23 and faces the stall 26 and is adapted to register with the switch 64. The circuit including the coil 66 is always live or hot, as shown in Fig. 8.

When the elevator 23 reaches the selected parking floor 22, facing the selected stall 26, the switch 64 closes due to the action of the coil 66 thus closing the circuit, the motor 59 in the stall being actuated to the left as indicated by the arrow in Fig. 8, thus turning the endless member 29, including the wheel engaging chocks, in a counter-clockwise direction as shown in Figs. 3 and 6, thus propelling the automobile 30 out of the parking stall 26 and onto the elevator 23. The switch 61 is retained in depressed position by means of a linkage schematically shown in Fig. 8. When the left front wheel 40 of the automobile 30 contacts the pressure switch 53 the chocks 38 and 39 are in the position shown in dotted lines in Fig. 6. The circuit leading to the switch 69 which was maintained in open position by means of a spring 70 was closed through the action of the coil 67 which was energized when the switch 64 was closed. The closing of this circuit when the switch 53 is closed which includes the motor 41 on the elevator actuates the motor 41 turning the endless member 27 on the elevator to the left as shown by the arrow in Fig. 8, i. e., in a counter-clockwise direction and together the two endless members 27 and 29 propel the automobile 30 onto the elevator 23. As the wheels of the automobile 30 move off the endless member 29 in the stall 26 the switches 60 and 61 are opened and the circuit is broken causing the endless member 29 to cease operation. A solenoid comprising the holding coil 68, however, remains energized keeping the switch 69 in closed position until the automobile 30 has been positioned on the elevator 23 at which time the switch 63 is unlocked by suitable mechanical means well known to those skilled in the art, thus breaking the circuit to the holding coil 68, opening the switch 69, thus causing the endless member 27 to be disabled.

The switch 61 was depressed when the automobile 30 was originally positioned in the stall 26. As shown in Fig. 8 in schematic form, a finger 72 is depressed when the switch 61 is depressed. At the lower extremity of the finger 72 a hook 73 is provided, adapted to engage with a hook 74 attached to a linkage member 75. The linkage member 75 is pivoted at 76. Attached to the switch 60 is a downwardly depending finger 77 terminating at its lower extremity in a cam 78. A horizontal arm 79 is attached to the lower extremity of the linkage member 75 adapted to be contacted by the cam 78. When the switch 60 is depressed the cam 78 rides over the arm 79 which pivots at 76 but is brought back into position by a spring 80. When the switch 61 is depressed the hook 73 and the hook 74 are engaged maintaining the switch 61 in the down position. When the automobile 30 moves out of the stall 26 the switch 60 raises up, the downwardly depending finger 77 moves up, the cam 78 striking the arm 79 causing the hooks 73 and 74 to disengage and the switch 61 moves to the up position as shown in Fig. 8. Any suitable mechanical arrangement for accomplishing this result may be used in accordance with our invention.

The switch 61, as described above, is now in the open or raised position which registers as an annunciator switch on the control panel, indicating that the parking stall 26 is now empty. The operator then directs the elevators 23 to the receiving or ground floor 21. The circuits for the parking stalls 25 are similarly closed and opened as described above, the stall switch 71' and the unstall switch 71, however, being used.

The functioning of the electrical circuits to accomplish the automatic operation of the vehicle receiving and transferring devices will now be described as shown in the wiring diagram in Fig. 8. The wiring diagram illustrates the wiring circuit for one set of oppositely disposed parking stalls 25 and 26 on any particular parking floor 22. A similar arrangement is also provided for each set of parking stalls. The wiring diagram is also shown for a single elevator 23. A similar arrangement is provided for each of the elevators 23.

On a control panel, not shown, indicating means, such as lights, are used to record whether the parking stalls are empty, acting in response to two pole annunciator switches 61 located in each stall. The control panel contains buttons for controlling the elevator mechanism for directing an elevator 23 to any desired floor. The control panel also contains the stall switch 54 and the unstall switch 62 which control the selector switches 56 and 63 and the circuits relating to parking and unparking for the parking stall 26. The control panel also contains the stall switch 71' and the unstall switch 71 which control the selector switches 56 and 63 and the circuits relating to parking and unparking for the parking stalls 25.

When an automobile 30 is positioned on the elevator 23 the switches 43 and 53 are closed. To park the automobile 30 in the parking stall 26 the stall switch 54 is closed, automatically throwing the selector switch 56 to the right hand position as shown. The circuit, including a power source to the motor 41 which operates the endless member 27 on the elevator, is now in a position to be completed when the switch 57 is closed. The closing of the stall switch 54 closes the circuit including a power source to the solenoid comprising the coil 55 through the switch 61. When the elevator 23 reaches the appropriate parking floor 22 the switch 57 on the elevator 23 and the coil 55 in the stall 26 are in registry. The coil 55 electromagnetically attracts the switch 57 overcoming the tension of the spring 58. The closing of the switch 57 completes the circuit on the elevator 23 actuating the motor 41 which drives the endless member 27 in a direction to propel the automobile 30 from the elevator 23 into the stall 26. As the automobile 30 enters the parking stall 26 a wheel contacts the switch 60 closing the circuit in the stall 26, including a source of power, actuating the motor 59 for the endless member 29. During this period both the endless member 27 and the endless member 29 cooperatively propel the automobile 30 into the parking stall 26. When the wheels of the automobile 30 leave the elevator 23 the pressure switch 53 opens breaking the circuit on the elevator 23 thus disabling the motor 41 which causes the endless member 27 to stop. The endless member 29, however, continues its travel until the automobile 30 is completely positioned in the stall 26, at which time the switch 61 is depressed breaking the circuit and cutting off the power to the motor 59 driving the endless member 29.

A similar operation is carried out for parking a vehicle in the stall 25. In this case the stall switch 71' is used, automatically throwing the selector switch 56 to the left hand position, shown in dotted lines. This will not be traced as it is similar to the parking cycle set forth above in connection with parking a vehicle in the stall 26.

When an automobile 30 is positioned in the stall 26 the switches 60 and 61 are closed. To unpark or withdraw an automobile 30 from the parking stall 26 the unstall switch 62 is closed, automatically throwing the selector switch 63 in the right hand position and the selector switch 56 to the left hand position. The circuit, including a power source to the motor 59 which operates the endless member 29 in the stall, is now in a position to be completed when the switch 64 is closed. The circuit including a power source on the elevator 23 through the solenoid comprising a coil 66 is always live or hot. When the elevator 23 reaches the appropriate parking floor 22 the switch 64 in the parking stall 26 and the coil 66 are in registry. The coil 66 electromagnetically attracts the switch 64 overcoming the tension of the spring 65. The closing of the switch 64 completes the circuit in the stall 26 actuating the motor 59 which drives the endless member 29 in a direction to propel the automobile 30 from the stall 26 into the elevator 23.

The closing of the switch 64 also completes the circuit including a power source to the solenoid comprising the coil 67 located in the stall 26 which is adapted to register with the switch 69. The switch 69 is electromagnetically attracted by the coil 67 overcoming the tension of the spring 70. The circuit including a power source on the elevator 23 is now in a position to be completed when the switch 53 is closed. As the automobile 30 enters the elevator 23 its wheel contacts the switch 53 which closes the circuit in the elevator including a source of power actuating the motor for the endless member 27. During this period both the endless member 27 and the endless member 29 cooperatively propel the automobile 30 into the elevator 23. When the wheels of the automobile 30 leave the parking stall 26 the pressure switch 60 opens, kicking open the switch 61 which was held in closed position by the linkage schematically shown. The opening of the switch 61 deenergizes the coil 67. A holding coil 68, however, attracts the switch 69 and maintains the circuit closed. The endless member 27 thus continues its travel until the automobile 30 is completely positioned on the elevator 23 at which time the selector switch 63 is uncocked to neutral position, the holding coil 68 is deenergized, the switch 69 opening the circuit cutting off the power to the motor 41 thus disabling the endless member 27.

A similar operation is carried out for unparking or removing a vehicle from the stall 25. In this case the selector switch 56 is automatically thrown to the right hand position and the selector switch 63 is automatically thrown to the left hand position when the unstall switch 71 is closed. This will not be traced as it is similar to the unparking cycle set forth above in connection with removing a vehicle from the stall 26.

In describing the building construction it is obvious that the various parking floors may be subterranean, i. e., below street level, or as shown. The invention may also be carried out in a construction that is not completely enclosed. The various parking floors may consist merely of the receiving and transferring devices suitably attached to the structural framework.

While we have shown an endless member or apron or platform conveyor it is obvious that the particular construction of a conveyor may vary widely and yet operate in accordance with the present invention. It is also possible to dispense with the wheel carrying platform and utilize an endless member that would carry all four wheels of an automobile both on the elevator and in the parking stalls and still operate in accordance with the present invention. In such a case the utilization of chocks could be dispensed with, the brakes of the automobile would then be set in closed position after the vehicle is driven onto the elevator.

We have shown a particular type of pressure switch. It is obvious that various other types of pressure switches may be used in accordance with the present invention. Instead of using solenoids comprising coils and switches adapted to be electromagnetically attracted by the coils when they are in registry it is clear that other means such as light and photoelectric cells responsive to said light or mechanically actuated switches may be used to close the circuits leading to the motors which actuate the endless members and still operate in accordance with our invention.

For the purposes of clarity we have described the use of a single motor for the actuation of the endless members reversible in type. It may be desirable to utilize two motors with appropriate wiring changes for each member in order to achieve a pulling force rather than a pushing force. Our invention includes the use of any appropriate driving means for the endless members which means would be in accordance with our invention.

While we have described a particular embodiment of our inventive structure it is thus obvious that various changes therein may be made without departing from our invention.

We claim:

1. In an automatic vehicle parking system, a parking stall, an elevator adapted to have a vehicle positioned thereon and adapted to register with said stall, an endless member on the elevator, a reversible motor for the actuation of the endless member, a remote control parking switch, means for energizing the motor from the actuation of the endless member on the elevator when the remote control parking switch is in closed position, said motor energizing means comprising a solenoid comprising an induction coil positioned in the stall, a first source of electrical energy, an electric circuit including a pressure switch and a cut-off switch connecting said electrical source to said solenoid, an electromagnetic switch positioned on the elevator adapted to register with said solenoid and movable by said solenoid when the latter is energized and the solenoid and electromagnetic switch are in registry, a second source of electrical energy, an electric circuit including a pressure switch and a selector switch connecting said second source, said motor on the elevator and said electromagnetic switch, whereby when said elevator is in registry with said stall, said electromagnetic switch is electromagnetically attracted by said solenoid closing the circuit on the elevator and energizing the motor on the elevator thus driving the endless member in a direction to propel a vehicle positioned on the elevator into the stall.

2. An automatic vehicle parking system as claimed in claim 1 including means for energizing the motor for the actuation of the endless member in the stall, said motor energizing means comprising an auxiliary electric circuit including a pressure switch, a cut-off switch connecting the first source of electrical energy and said motor in the stall, and wherein said pressure switch is located on the endless member positioned in the stall, said pressure switch being adapted to complete the auxiliary electric circuit when a wheel of the vehicle being propelled from the elevator by the endless member on the elevator contacts said pressure switch, thus driving the endless member in a direction to propel the automobile from the elevator into the stall, the cutoff switch being adapted to break the auxiliary electrical circuit when the travel of the endless member has positioned the vehicle within the parking stall.

3. In an automatic vehicle parking system, a parking stall adapted to have an automobile positioned therein, an elevator adapted to register with said stall, an endless member in the stall, a reversible motor for the actuation of the endless member, an endless member on the elevator, a reversible motor for the actuation of the endless member on the elevator, a remote control unparking switch, means for energizing the motor for the actuation of the endless member in the stall when the remote control unparking switch is in closed position, said motor energizing means comprising a solenoid comprising a constantly energized induction coil located on the elevator, a source of electrical energy, an electromagnetic switch positioned in the stall adapted to register with said solenoid and movable by said solenoid when the latter and the electromagnetic switch are in registry, an electric circuit including a pressure switch and a cut-off switch connecting said source, said motor in the stall and said electromagnetic switch whereby when said elevator is in registry with said stall, said electromagnetic switch is electromagnetically attracted by said solenoid closing the circuit and starting the motor in the stall thus driving the endless member in a direction to propel the automobile from the stall into the elevator.

4. In an automobile vehicle parking system as claimed in claim 3, means for energizing the motor for the actuation of the endless member on the elevator when the remote control unparking switch is in closed position, said motor energizing means comprising a solenoid comprising an induction coil positioned in the stall, an auxiliary electric circuit connecting said electrical source to said solenoid, an electromagnetic switch positioned on the elevator adapted to register with said solenoid and movable by said solenoid when the latter is energized and the solenoid and electromagnetic switch are in registry, a second source of electrical energy, a holding induction coil, means including a pressure switch and a selector switch connecting said second source, said motor on the elevator and said electromagnetic switch whereby when said elevator is in registry with said stall, said electromagnetic switch is electromagnetically attracted by said solenoid closing the switch, said pressure switch being located on the endless member positioned on said elevator, said pressure switch adapted to complete the electrical circuit when the wheels of the vehicle being propelled from the stall by the endless member in the stall contact, said pressure switch thus driving the endless member in a direction to propel the automobile from the stall onto the elevator, said holding induction coil acting to keep the electromagnetic switch closed when the circuit energizing the solenoid in the stall is broken when the automobile is completely out of the stall until the endless member on the elevator has completed its travel to position the automobile in the elevator.

5. In an automatic vehicle parking system, a structure having a receiving floor approximately at street level having provision through which incoming and outgoing vehicles may pass, a plurality of vertically spaced parking floors, a transverse row of elevator shafts, a vertical tier of storage stalls disposed on the various parking floors and on opposite sides of each elevator shaft, an elevator operable within each elevator shaft adapted to be aligned with a pair of the oppositely disposed storage stalls on each parking floor, a vehicle wheel receiving runway mounted on one side of the elevator adapted to receive a set of wheels on one side of a vehicle, a vehicle wheel receiving motor driven endless member mounted on the opposite side of the elevator from the runway adapted to receive the set of wheels on the other side of the vehicle, a vehicle wheel receiving runway mounted on one side of the stall to receive a set of wheels on one side of a vehicle, the runway being adapted to form an extension of the runway on the elevator when the elevator is in registry with the stall, a vehicle wheel receiving motor driven endless member mounted on the opposite side of the stall from the runway adapted to receive the set of wheels on the other side of the vehicle, the endless member being adapted to form an extension of the endless member on the elevator when the elevator is in registry with the stall, pressure switches on the endless member positioned on the elevator, an electric circuit for said motor including said pressure switches, said pressure switches being adapted to close a branch of the electrical circuit when a vehicle is positioned on the elevator and adapted to open a branch of the electrical circuit when a vehicle is removed therefrom and the elevator is empty to disable the endless member, and chocks carried on said motor driven endless members, movable with said endless members and engageable with one of the wheels of the vehicle whereby, the successive and cooperative movement of the endless members is transmitted to the vehicle to propel the same on its own wheels from the elevator into a stall and from a stall into the elevator when the elevator is aligned with the stall.

6. In an automatic vehicle parking system, a structure having a receiving floor approximately at street level having provision through which incoming and outgoing vehicles may pass, a plurality of vertically spaced parking floors, a transverse row of elevator shafts, a vertical tier of storage stalls disposed on the various parking floors and on opposite sides of each elevator shaft, an elevator operable within each elevator shaft adapted to be aligned with a pair of the oppositely disposed storage stalls on each parking floor, a vehicle wheel receiving runway mounted on one side of the elevator adapted to receive a set of wheels on one side of a vehicle, a vehicle wheel receiving motor driven endless member mounted on the opposite side of the elevator from the runway adapted to receive the set of wheels on the other side of the vehicle, a vehicle wheel receiving runway mounted on one side of the stall to receive a set of wheels on one side of a vehicle, the runway being adapted to form an extension of the runway on the elevator when the elevator is in registry with the stall, a vehicle wheel receiving motor driven endless member mounted on the opposite side of the stall from the runway adapted to receive the set of wheels on the other side of the vehicle, the endless member being adapted to form an extension of the endless member on the elevator when the elevator is in registry with the stall, an electrical circuit for each motor driven endless member and a pressure switch in said circuit, said pressure switch being integral with the endless member positioned in the stall, said pressure switch adapted to close a branch of the electrical circuit when a vehicle is positioned in the stall and to open a branch of the electrical circuit when a vehicle is removed therefrom and the stall is empty, to disable the endless member, and chocks carried on said motor driven endless members, movable with said endless members and engageable with one of the wheels of the vehicle whereby the successive and cooperative movement of the endless members is transmitted to the vehicle to propel the same on its own wheels from the elevator into a stall and from a stall into the elevator when the elevator is aligned with the stall.

SUMNER J. SUMNERS.
HUGH W. FRASER.

References Cited in the file of this patent

UNITED STATES PATENTS

| Number | Name | Date |
|---|---|---|
| 1,635,276 | Johnson | July 12, 1927 |
| 1,686,382 | Johnson et al. | Oct. 2, 1928 |
| 1,740,014 | Hawkins | Dec. 17, 1929 |
| 1,803,583 | Aitken | May 5, 1931 |
| 1,864,711 | Buettell | June 28, 1932 |
| 1,879,713 | Scott | Sept. 27, 1932 |
| 1,934,590 | Ellis, Jr. et al. | Nov. 7, 1933 |
| 1,955,959 | Harnischfeger | Apr. 24, 1934 |
| 1,969,002 | Gleichman | Aug. 7, 1934 |
| 2,014,351 | Becker | Sept. 10, 1935 |
| 2,028,391 | Harnischfeger | Jan. 21, 1936 |
| 2,204,023 | Mason | June 11, 1940 |

FOREIGN PATENTS

| Number | Country | Date |
|---|---|---|
| 120,169 | Great Britain | Oct. 31, 1918 |